United States Patent
La Fleur et al.

(10) Patent No.: US 6,593,399 B1
(45) Date of Patent: Jul. 15, 2003

(54) PREPARING CONDUCTIVE POLYMERS IN THE PRESENCE OF EMULSION LATEXES

(75) Inventors: Edward Ewart La Fleur, Warminster, PA (US); Jiun-Chen Way, Robbinsville, NJ (US)

(73) Assignee: Rohm and Haas Company, Philadelphia, PA (US)

(*) Notice: Subject to any disclaimer, the term of this patent is extended or adjusted under 35 U.S.C. 154(b) by 0 days.

(21) Appl. No.: 09/562,344

(22) Filed: May 1, 2000

Related U.S. Application Data

(60) Provisional application No. 60/137,574, filed on Jun. 4, 1999.

(51) Int. Cl.$^7$ ................. H01B 1/12; C08G 61/12; C08G 73/02; C09D 5/24
(52) U.S. Cl. ............ 523/201; 524/430; 524/458; 524/612; 524/803; 525/348; 525/375; 525/385; 525/411; 525/412; 525/415; 526/73; 526/75; 526/256; 526/258; 526/265; 526/270
(58) Field of Search ............ 523/201; 524/430, 524/503, 612, 803, 458; 525/57, 186, 411, 353, 412, 410, 415, 417, 348, 375, 385; 526/73, 80, 87, 201, 256, 258, 266, 270, 265, 310; 528/378, 408, 423, 425

(56) References Cited

U.S. PATENT DOCUMENTS

| | | | |
|---|---|---|---|
| 4,731,408 A | * 3/1988 | Jasne | ............ 524/458 |
| 5,232,631 A | 8/1993 | Cao et al. | ............ 252/500 |
| 5,324,453 A | 6/1994 | Cao et al. | ............ 252/500 |
| 5,378,403 A | 1/1995 | Shacklette | ............ 252/500 |

FOREIGN PATENT DOCUMENTS

| | | | |
|---|---|---|---|
| DE | 4334390 | 4/1995 | |
| EP | 0 336 468 | 10/1989 | |
| EP | 0825618 | 2/1998 | |
| JP | 01069621 | * 3/1989 | ............ 528/128 |
| JP | 03234733 | * 10/1991 | ............ C08J/3/12 |
| JP | 06093190 | * 4/1994 | ............ 524/501 |
| JP | 07157549 | * 4/1995 | ............ C08G/61/12 |

OTHER PUBLICATIONS

"Binding Characteristics of a New Host Family of Cyclic Oligosaccharides from Inulin: Permethylated Cycloinulohexaose and Cycloinulohepaose", Yoshio Takai, et al; J. Org. Chem. 1994,59, pp. 2967–2975.

"A Covalent Bond To Bromine In HBr–Treated Polyaniline From X–Ray Diffraction"; B. K. Annis and A. H. Narten; Synthetic Metals, 22 (1988) pp. 191–199.

* cited by examiner

*Primary Examiner*—Kelechi Egwim
(74) *Attorney, Agent, or Firm*—Richard R. Clikeman

(57) ABSTRACT

A method for preparing an intrinsically conductive copolymer comprising preparing an emulsion latex in a medium; forming a mixture which comprises at least one cyclic heteroatom containing monomer, the emulsion latex in the medium and an additive under first condition effective to maintain the emulsion latex in a first stabilized emulsion state, causing the monomer in the mixture to polymerize under second condition effective to produce the conductive copolymer in a second stabilized emulsion state. Additives include cyclodextrins, partially alkylated cyclodextrins, poly(vinyl alcohol), partially hydrolyzed poly(vinyl acetate), poly(vinyl acetate) and mixtures thereof.

6 Claims, No Drawings

PREPARING CONDUCTIVE POLYMERS IN THE PRESENCE OF EMULSION LATEXES

This application claims the benefit of Provisional application No. 60/137,574, filed Jun. 4, 1999.

The present invention relates to a method for preparing intrinsically conductive copolymers (ICPs) from polymerizing at least one cyclic heteroatom-containing monomer such as aniline, thiophene, pyrrole, furan, and the derivatives or substituted forms of the respective monomers and an emulsion latex which remains substantially stable in the presence of the cyclic heteroatom-containing monomers and during the course of the polymerization. This invention further relates to the compositions of the intrinsically conductive copolymers prepared in accordance with the method. In addition, the invention also relates to a method of preparing blends of ICPs with carbonaceous materials, metal oxide powders and polar polymers.

ICPs are known to be useful for a number of applications. For instance, ICPs maybe used as part of a coating formulation for inhibiting corrosions of metals, particularly iron or iron based metals such as carbon steel and different types of stainless steel, aluminum, aluminum alloys, nickel and others.

It is known that a number of cyclic heteroatom (O, S, and N)-containing monomers such as aniline, furan, pyrrole, thiophene and their derivatives can be polymerized to yield ICPs. Most of such polymer products are known to be intractable. Typical ICPs do not have very high solubilities in commonly used solvents, and they are usually thermally unstable, infusible and brittle. As a result, most ICPs cannot be processed easily by conventional methods used for processing other polymers. Attempts to solve the processing problems over the past several years produced only limited success. As a result, many predictions that these conductive polymers would usher in novel products such as polymer batteries, electrical wires, or capacitors have largely not been realized.

Polyaniline is an example. It is commonly prepared by an oxidative polymerization of aniline in the presence of a protonic acid. The polymer product is an insoluble green solid precipitate, mostly amorphous and generally insoluble in common organic solvents (see Annis et al., *Synthetic Metals*, 22:191, 1986). U.S. Pat. No. 5,232,631 describes a number of polyaniline salts prepared by reacting polyaniline in the presence of an acid such as dodecylbenzene sulfonic acid, 1,5-naphthalenedisulfonic acid and p-toluene sulfonic acid. These polyaniline salts are only sparingly soluble in nonpolar solvents. U.S. Pat. No. 5,232,631 and U.S. Pat. No. 5,324,453 describe the synthesis of polyaniline from a mixture which consists of an aniline monomer, a protonic acid, an oxidant, a polar liquid such as water and a nonpolar or weakly polar liquid chosen from chloroform, xylene, toluene, decahydronaphthalene and 1,2,4-trichlorobenzene. In such a process, post-polymerization removal of residual organic solvents in the polymer products to an acceptable level may pose a substantial challenge to a prospective manufacturer.

The present invention relates to a (co)polymerization method which overcomes many of the difficulties encountered in the prior art and/or provides improvements to the chemical, physical, or mechanical properties of the resultant ICPs which are prepared from at least one cyclic heteroatom-containing monomer.

The present invention also relates to a method for preparing an intrinsically conductive copolymer comprising: preparing an emulsion latex in a medium; forming a mixture by adding at least one cyclic heteroatom-containing monomer to the emulsion latex in the medium under first condition effective to maintain the emulsion latex in a first stabilized emulsion state; causing the monomer(s) in the mixture to polymerize under a second condition effective to produce the conductive copolymer in a second stabilized emulsion state; and optionally, recovering the intrinsically conductive copolymer.

The present invention further relates to a method, wherein the cyclic heteroatom-containing monomer is selected from the group consisting of aniline, substituted anilines, thiophene, substituted thiophenes, furan, substituted furans, pyrrole, substituted pyrroles, and mixtures thereof.

Another embodiment of the present invention relates to an intrinsically conductive copolymer composition prepared by the invented method. The present invention further relates to different methods of using the ICPs in coating formulations with an option of providing a top-coating over the layer containing the ICPs. More specifically, the present invention relates to a method of using the intrinsically conductive copolymer prepared according to claim 1 or 9, the method comprises preparing a coating composition which comprises the intrinsically conductive copolymer; and applying the coating composition on a surface of a metal to form a first layer, optionally applying a top coat layer over the first layer.

It has been discovered unexpectedly that ICPs can be prepared chemically, electrolytically or electrochemically by emulsion polymerization and/or copolymerization and/or graft copolymerization of at least one cyclic heteroatom-containing monomer in the presence of a stable latex emulsion under conditions effective to maintain such stabilized emulsion conditions in one, two- or multi-stages. Examples of a suitable heteroatom include O, N, and S. More than one heteroatoms may be present in the same cyclic heteroatom-containing monomer or in the ICP itself from different monomers incorporated into the ICP. For the present invention, the resultant ICP product should have an intrinsic conductivity equal to or greater than $5 \times 10^{-4}$ Siemens per centimeter, preferably greater than $5 \times 10^{-2}$ Siemens per centimeter, more preferably greater than 1 Siemens per centimeter. It is also within the scope of the present invention that the conductivity is increased by doping with a suitable dopant.

Cyclic heteroatom-containing monomers suitable for use to be (co)polymerized in the present invention include, but are not necessarily limited to aniline, thiophene, pyrrole, furan, substituted anilines, substituted thiophenes, substituted pyrroles, substituted furans, and mixtures thereof. They are of the following generalized structures.

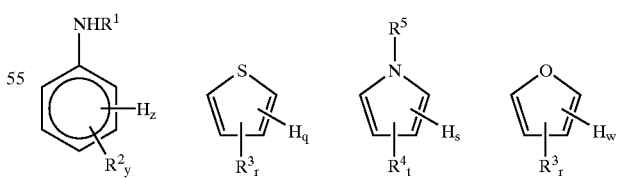

wherein q, r, s, t, w, x, y, and z are independently selected from positive integers and 0(zero); y+z=5; q+r=4; s+t=4; and w+x=4; $R^1$ and $R^5$, are independently selected from the group consisting of H and $C_1$ to $C_{18}$ linear or branched alkyl groups, H and $CH_3$ are preferred; $R^2$, $R^3$, $R^4$, and $R^6$ are independently selected from H, $C_1$ to $C_{18}$ linear or branched alkyl groups, aryl groups such as phenyl or substituted phenyls, a benzo group (occupying two adjacent sites on the ring), C(=O)OH, C(=O)H, CH$_2$OH, CH$_2$OC(=O)R$^7$ where R$^7$ is selected from C$_1$ to C$_6$ linear or branched alkyl groups, CH$_2$CH$_2$OH, CH$_2$SH, CN, CH$_2$NH$_2$, C(=O)NH$_2$, CH$_2$CN, O—R$^8$ where R$^8$ is selected from C$_1$ to C$_6$ linear or branched alkyl groups, C(=O) R$^9$ where R$^9$ is selected from C$_1$ to C$_6$ linear alkyl groups, and mixtures thereof. To the extent that it discloses such polymerizable heteroatom-containing cyclic monomers, U.S. Pat. No. 5,648,416 is incorporated herein by reference. Many of these compounds can be purchased from Aldrich Chemical Company, ICN Biomedicals, Inc., and other chemical suppliers.

Examples of substituted monomers include, but are not necessarily limited to, alkyl or aryl substituted monomers such as 2-methylaniline, 2-ethylaniline, 3-ethylaniline, 2-methylthiophene, 3-methylthiophene, 3-hexylthiophene, benzo[b]thiophene, 2-methylpyrrole, 2-methylfuran, and mixtures thereof. Many of these cyclic heteroatom-containing monomers may be considered as "aromatic" in nature. In general, these cyclic monomers are characterized by being insoluble or substantially insoluble in, or immiscible or substantially immiscible with water (less than about 1 g per 100 g of water).

An aqueous emulsion latex is a preferred emulsion latex for the present invention. Examples of such an emulsion latex, also referred to as a binder in many references, which may be used in a stabilized or substantially stabilized emulsion state, include, but are not necessarily limited to homopolymers or copolymers prepared from one or more monomers selected from one or more of the following groups:

Group A:
  ethylenically unsaturated carboxylic acids and their esters such as acrylic acid (AA), methacrylic acid (MAA), methyl acrylate (MA), ethyl acrylate (EA), propyl acrylate (PA), butyl acrylate (BA), 2-ethylhexyl acrylate (2EHA), methyl methacrylate (MMA), ethyl methacrylate, propyl methacrylate, butyl methacrylate (BMA), poly (ethylene glycol[200/400] monomethacrylate and mixtures thereof;

Group B:
  vinyl compounds such as ethylene, propylene, butadiene (BD), substituted butadienes such as alkylbutadienes-isoprene, allyl acrylate, allyl methacrylate(ALMA), vinyl chloride (VCM), vinyl acetate (VAM), styrene (ST), p-methylstyrene (PMS), 4-vinylpyridine (4 VP), 2-vinylpyridine (2 VP), N-vinylpyrrolidone (NVP), styrene sulfonic acid(SSA) and mixtures thereof;

Group C:
  unsaturated amides such as acrylamide, methacrylamide, N-methylolacrylamide and mixtures thereof;

Group D:
  other unsaturated monomers containing nitrogen or silicon such as dimethylaminoethyl acrylate, trimethylvinylsilane and mixtures thereof;

It is understood that the mixtures mentioned above and elsewhere must be chemically and physically compatible with one another as well as other ingredients under the reaction conditions.

The total amount(s) of a monomer or monomer mixtures selected from Groups A and/or B should be in the range of from 85% to 100%, preferably from 97.5% to 100% by weight of the resultant polymer, based on the total weight of the polymer in the emulsion latex.

The amount(s) of a monomer or monomer mixtures selected from Groups C and/or D, if there are any, should be in the range of from 0% to 50%, preferably from 0% to 5%, most preferably from 0% to 2.5%, by weight in the polymer, based on the total weight of the polymer in the emulsion latex.

Examples of preferred polymers (binders) for the emulsion latex suitable for the present invention include, but are not necessarily limited to: poly(MMA-BA=15-85), poly(MMA-4VP=85-15), poly(MMA-MAA=80-20), poly(BA-BD=60-40), poly(MMA-EA-4VP=70-15-15), poly(MMA-EA-4VP=65-20-15), poly(MMA-EA-4VP=45-40-15), poly(MMA-EA-4VP=70-15-15), poly(ST-4VP=85-15), poly(MMA-EA-SSA=50-45-5), poly(MMA-EA-ALMA=95.8-4-0.2), poly(BA-ST-ALMA=80-18-2) and mixtures thereof.

The solids content of a suitable aqueous emulsion latex for the present invention is in the range of from 5% to 90%, by weight, based on the total weight of the aqueous emulsion latex, preferably in the range of from 10% to 75% by weight, more preferably in the range of from 20% to 50% by weight. Many emulsion seed particles used in the examples described herein are derived from a 30% solids content aqueous emulsion latex.

An emulsion latex having a desired composition as described herein may be prepared form polymerizing the selected monomers by a number of methods or processes disclosed in the prior art such as "*Emulsion Polymerization of Acrylic Monomers:* May, 1966" published by the Rohm and Haas Company, Philadelphia, Pa., and "*Polymer Syntheses,*" Vol. I, Chapter 10 by S. R. Sandler and W. Karo, Academic Press, New York, N.Y. (1974). To the extent of relevant descriptions or disclosures of such methods or processes, both references are incorporated herein by reference.

A number of methods or processes are within the scope of the present invention for preparing the ICPs. A method or a process is suitable for the present invention only if the aqueous emulsion latex can be maintained or substantially maintained in a stabilized or substantially stabilized emulsion state during the process when the cyclic heteroatom-containing monomer(s) is polymerized, copolymerized and/or graft copolymerized, particularly in the presence of highly charged cationic species and/or a pH in the acidic range. Any significant or substantial phase separation, collapse and/or agglomeration of the dispersed/suspended emulsion latex micelles or particles would render the method or process not suitable for preparing the desired ICPs of the present invention. Accordingly, the term "substantially stabilized emulsion state" used herein means that there is no significant loss of the original emulsion state during and after the formation of the initial mixture, and during and preferably after the desired polymerization/co-polymerization/graft polymerization reaction has taken place via a single, two- or multi-stage process.

More specifically, one aspect of the present invention involves a method for preparing an intrinsically conductive copolymer composition comprising: preparing an emulsion latex in a medium; forming a mixture which comprises at least one cyclic heteroatom-containing monomer, the emulsion latex in the medium and an additive under a first condition effective to maintain the emulsion latex in a first stabilized emulsion state; and causing the cyclic heteroatom-containing monomer in the mixture to polymerize under a second condition effective to produce the intrinsically conductive copolymer in a second stabilized emulsion state.

Another aspect of the present invention relates to a method for preparing an intrinsically conductive copolymer composition comprising: preparing an emulsion latex in an aqueous medium; forming a mixture which comprises at least one cyclic heteroatom-containing monomer, the emulsion latex in the aqueous medium and an additive under first condition effective to maintain the emulsion latex in a first stabilized emulsion state; causing less than 10% by weight of the cyclic heteroatom-containing monomer based on total weight of the cyclic heteroatom containing monomer in the mixture to polymerize at a first reaction temperature and under second condition effective to produce a precursor to the intrinsically conductive copolymer in a second stabilized emulsion state; and converting the precursor and remainder of the cyclic heteroatom-containing monomer in the mixture at a second reaction temperature and under third condition effective to produce the conductive copolymer in a third stabilized emulsion state, wherein the second temperature is lower than the first temperature.

The cyclic heteroatom-containing polymerizable monomers, many of them considered to be aromatic in nature, are generally insoluble in an aqueous medium, but can be emulsified under proper conditions. In the presence of an emulsion latex, they can be homopolymerized, copolymerized or graft copolymerized by a number of methods including, but not necessarily limited to cationic oxidation polymerization in an acidic aqueous medium, electrochemical anodic deposition and combinations thereof. A method of cationic oxidation polymerization in an acidic aqueous medium (pH value lower than 7.0) is preferred for the present invention.

One embodiment of the present invention relates to a method of using the intrinsically conductive copolymer prepared according to the disclosed methods herein, the method comprises forming a coating composition which comprises the intrinsically conductive copolymer; mixing the coating composition with a top-coating composition to form a blend; and applying the blend on a surface of a metal.

In yet another embodiment of the present invention, a heteroatom-containing polymerizable cyclic monomer or monomer mixture is mixed with an emulsion latex described herein to form a mixture under conditions which are effective in maintaining or substantially maintaining a stabilized or substantially stabilized emulsion state when forming such a mixture and during subsequent polymerization, copolymerization and/or graft copolymerization. The amount of a monomer or monomer mixture used depends on a number of factors, including, but not necessarily limited to: the desired ICP composition, the composition of the emulsion latex, the composition of the monomer or monomer mixture, the complexing agent used, the emulsifying agent used, and other reaction conditions such as pH, temperature, etc.

One way of maintaining a stabilized emulsion state is to have a complexing agent and a non-aromatic emulsifying agent in the aqueous emulsion latex. It is preferred to add such a complexing agent or emulsifying agent prior to or during the time when the monomer is mixed with the emulsion latex to form the mixture.

Without limiting the scope or the spirit of the present invention, it is believed that a complexing agent like β-MCD, as described below, provides a function of transporting a water-insoluble aromatic monomer(s) through the aqueous phase to the surface of the emulsion seed particles. Example of a suitable complexing agent include, but are not necessarily limited to a cyclodextrin, a partially alkylated cyclodextrin, a saccharide, a cycloinulohexose, a cycloinuloheptose, a cycloinuloctose; a calyxarene; a cavitands and mixtures thereof. Preferably, a complexing agent should have or could form a hydrophobic cavity with a hydrophilic exterior surface. More preferably, the hydrophobic cavity is large enough to form a host-guest relationship with the specific polymerizable heteroatom-containing monomer(s) used to prepare the desired ICPs. Descriptions of such a host-guest relationship and the relevant chemistry can be found in many papers published by Professor Donald J. Cram of University of California at Los Angeles, USA.

Examples of cyclic oligosaccharides having a hydrophobic cavity, such as cycloinulohexose, cycloinuloheptose, useful in the method of the invention are described by Takai et al., Journal of Organic Chemistry, 1994, volume 59, number 11, pages 2967–2975. Examples of calyxarenes are described in U.S. Pat. No. 4,699,966, International Patent Publication WO 89/08092 and Japanese patent publications 1988/197544 and 1989/007837. Examples of cavitands are described in Italian patent application 22522 A/89 and Moran et al., Journal of the American Chemical Society, volume 184, 1982, pages 5826–5828.

Preferably, a complexing agent suitable for the present invention is characterized by a solubility of greater than 0.5 g/100 g water, preferably greater than 1.0 g/100 g water, more preferably greater than 2.5 g/100 g water. It is preferred that the complexing agent has the ability to form at least a semi-stable complex, such as a guest-host relationship, with the monomer(s) used. Examples of complexing agents include, but are not necessarily limited to cyclodextrins such as alpha-cyclodextrin (hydrate, α-CD); beta-cyclodextrin (hydrate, β-CD); gamma-cyclodextrin (γ-CD); partially alkylated cyclodextrins or cyclodextrin derivatives such as methyl beta-cyclodextrin (β-MCD), sulfated beta-cyclodextrin, triacetyl-beta-cyclodextrin, hydroxypropyl and hydroxyethyl derivatives of alpha, beta, or gamma cyclodextrins; and mixtures thereof. Examples of a saccharide are mon-, di-, tri-, or tetra-saccharides and mixtures thereof. A more preferred complexing agent consists essentially of β-MCD. The amount of a complexing agent used in the mixture is in the range of from 0 to 10 weight percent (wt %), based on the total weight of the monomer(s) used. More preferably, the amount is in the range of from 2 to 5 wt %.

Examples of an emulsifying agent include, but are not necessarily limited to a non-aromatic sulfonate and mixtures thereof. Examples of a non-aromatic sulfonate include SOLUSOL®. Other common commercially available emulsifying agents are sodium lauryl sulfate, TRITON X-100 and TRITON X-200. SOLUSOL is a registered trademark of American Cyanamid Company. TRITON is a registered trademark owned by Union Carbide Corporation.

In addition to a complexing agent and an emulsifying agent, it is preferred to add an additional chemical or additives which tends to further improve the stability of the emulsion state before, during, and after polymerization, copolymerization, and/or graft copolymerization. Examples of such a chemical include, but are not necessarily limited to poly(vinyl acetate), poly(vinyl alcohol), partially hydrolyzed poly(vinyl acetate) which contains vinyl alcohol units, other OH group containing polymers prepared from monomers such as 2-hydroxyethyl acrylate, 2-hydroxyethyl methacrylate, 3-hydroxypropyl acrylate, 3-hydroxypropyl methacrylate, 4-hydroxybutyl acrylate, 4-hydroxybutyl methacrylate, and mixtures thereof. A preferred additive is an 88/12(by mole) poly (vinyl alcohol)/(vinyl acetate) copolymer.

Continuous and sufficient agitation is one method to maintain or substantially maintain the mixture in a stabilized or substantially stabilized emulsion state before and during polymerization reaction. Alternately, a suitable mixture comprising a suitable monomer(s), a complexing agent and an emulsifying agent may be added continuously to the reactor to effect the desired polymerization reaction.

A mixture which comprises an emulsion latex, a heteroatom-containing polymerizable monomer or monomer mixture, an emulsifying agent and a complexing agent may be formed before conducting the desired polymerization. In a continuous or semi-continuous process or method, the emulsifying agent and/or the complexing agent may be added to the emulsion latex first, or one or both of them can be mixed with the monomer first followed by adding this to the emulsion latex.

Formation of the mixture may be carried out under conditions which allow maintaining or substantially maintaining a stabilized or substantially stabilized emulsion state of the emulsion latex used. The temperature is in the range of from 0° C. to 85° C., preferably from 4° C. to 55° C., most preferably from 6° C. to 40° C. Pressure is generally not very critical unless it is necessary to maintain a more desired concentration of the monomer(s) for the polymerization step. A suitable pressure is in the range of from 10 kPa to 2 MPa. A preferred pressure is in the range of from 50 kPa to 500 kPa. An inert atmosphere also may be used and is preferred. The selection of a particular gas may depend on the reactants used to ensure chemical compatibility. Suitable inert or non-reactive gases include, but are not necessarily limited to nitrogen, argon, carbon dioxide, methane and mixtures thereof. In most cases, nitrogen is a preferred inert gas. Air or diluted air also may be used provided there is no interference with the stability of the components used or the desired polymerization reaction.

In order to effect the desired polymerization, copolymerization, and/or graft copolymerization, either a proper initiator is needed, or an electric current must be applied to the reaction mixture. It is preferred to use a chemical initiator. A preferred initiator comprises a redox pair- a reducible metal compound and an oxidant. Many such initiators or redox pairs are known. Examples of a reducible metal compound include, but are not necessarily limited to Fe(III), Co(III), Cu(II) compounds and mixtures thereof. One such compound is $FeCl_3$. Examples of oxidants include, but are not necessarily limited to ammonium persulfate [APS $(NH_4)_2S_2O_8$], t-butyl hydroperoxide, $H_2O_2$, alkyl peroxy bicarbonates such as n-propyl peroxy bicarbonate, peracetic acid, trifluoro peracetic acid, perbenzoic acid and mixtures thereof. A preferred redox pair consists essentially of $FeCl_3$ and $(NH_4)_2S_2O_8$.

When a chemical initiator is used, particularly in an aqueous medium, it is preferred to have a pH value in the acidic region, i.e. lower than 7. It is more preferred to have a pH lower than 4. It is most preferred to have a pH lower than 2 when iron (III) compound or compounds are used as part of an initiator or a redox pair.

The amount of a chemical initiator needed is in the range of from 0.001 wt % to 15 wt %, based on the total weight of the monomer(s) to be polymerized. When a redox pair is used as the chemical initiator, the molar ratio of the reducible metal compound to the oxidant is in the range of from 1:1 to 1:1000, preferably in the range of from 1:10 to 1:100, assuming that the oxidation states or oxidation state equivalents for both change by a ratio of 1. If the ratio is not 1, then the molar ratio has to be adjusted accordingly. For instance, if the reducible metal changes its oxidation state by 2 and the oxidant changes only by 1, the relative molar amount of the oxidant has to be increased by a factor of 2.

The polymerization reaction, (homopolymerization, copolymerization, and graft copolymerization all considered to be within the scope of this invention) of a suitable monomer may be carried out under a number of effective conditions. Such conditions must maintain or substantially maintain a stabilized or substantially stabilized emulsion state of the emulsion latex used. The temperature is in the range of from about 0° C. to about 70° C. and preferably from 5° C. to 55° C.

It is preferred that the polymerization reaction is carried out in two stages at two different temperatures. It is more preferred that the temperature of the second stage is lower than the temperature of the first stage. In the first stage, a minimum of 10 weight percent, but not more than 50 weight percent, based on the total weight of the monomer(s) used, is polymerized to produce a precursor to the desired ICP. At the end of this stage, the product should still be maintained in a stabilized or substantially stabilized emulsion state. Not all the monomer(s) need be added at the beginning of the first stage. For instance, an amount of the monomer(s) equivalent to the amount of the precursor desired may be added for the first stage and the remainder of the monomer(s) is added prior to or during the second stage reaction. An example of such a precursor is the preparation of leucoemeraldine when aniline is the selected as the cyclic heteroatom-containing monomer.

The reaction temperature for the second stage is changed, preferably lowered. During this second stage, the remainder of the monomer(s) is further polymerized to produce the desired ICP products. For the present invention, it is not necessary to completely polymerize all the monomers present.

If the reaction is conducted in a continuous reaction system, stage one and stage 2 may represent different reaction zones of a reactor or different reactors. The reaction times for different stages, if there are any, are adjusted to produce the desired ICP. The reaction times may vary for the same reaction if conducted in different reaction systems. In general, the reaction time is in the range of from 0.05 seconds to 24 hours, preferably in the range of from 1 second to 12 hours.

Pressure of the reaction is generally not a critical parameter unless it is necessary to maintain a more desirable concentration(s) of the monomer(s) for the polymerization step or to facilitate flows in a continuous reactor. A suitable pressure is in the range of from 10 kPa to 2 MPa. A preferred pressure is in the range of from 50 kPa to 500 kPa. An inert or non-reactive atmosphere also may be used and is preferred. The selection of a particular inert or non-reactive gas may depend on the reactants used to ensure chemical compatibility and no change of critical reaction parameters such as pH. Suitable inert or non-reactive gases include, but are not necessarily limited to nitrogen, argon, carbon dioxide, methane and mixtures thereof. Nitrogen is a preferred inert gas. Air or diluted air also may be used provided that there is no interference with the chemical/physical stability of the components used or the desired polymerization reaction.

After the polymerization reaction is completed, the polymer products, ICPs, may be separated or recovered by a number of methods which are known to be suitable for emulsion polymers. Examples of such separation or recovery include, but are not necessarily limited to sedimentation, filtration, solvent removal, concentration, centrifugation, coagulation, spray drying, and combinations thereof.

The ICPs or other polymer products can be analyzed or characterized by a number of analytical tools to determine what type of polymerization has taken place, and what level of conductivity has been achieved. The specific chemistry or chemistries discussed herein are not intended to limit the scope of the present invention.

An ICP produced by the method of the present invention can be further doped with a dopant under proper reaction conditions. If desired, doping may be repeated several times with the same or a different dopant by the same or a different method. Suitable dopants are known to further increase the conductivity of an ICP. Examples of suitable dopants include, but are not necessarily limited to: HCl, $BF_3$, $PCl_5$, $AlCl_3$, $SnCl_4$, $WCl_6$, $MoCl_5$, $Zn(NO_3)_2$, tetracyanoethylene, p-toluenesulfonic acid, trifluoromethyl sulfonic acid and mixtures thereof.

In one method of doping an ICP, an undoped ICP is brought into contact with a dopant material as a solid, liquid, vapor, or solution. Examples of solvents suitable for making dopant solutions include, but are not necessarily limited to N-methylpyrrolidone, methanol, ethanol, tetrahydrofuran, acetonitrile, diethyl ether and mixtures thereof. Selection of a solvent depends on many factors, including the solubility of a particular dopant, chemical and/or physical compatibility between ICP and the solvent, chemical and/or physical compatibility between the dopant and the solvent and others. Preferably, a solution has a dopant concentration in the range of from about 0.05 Molar to about 2.5 Molar.

In another embodiment of the present invention, the ICP product, with or without a dopant also may be mixed, blended, admixed with one or more other materials to form a desired product. Such other materials include, but are not necessarily limited to carbonaceous materials, metal oxide powders and polar polymers materials and mixtures thereof. Examples of carbonaceous materials include, but are not necessarily limited to carbon black, graphite, amorphous carbon, activated carbon and mixtures thereof. Examples of metal oxide powders include, but are not necessarily limited to iron oxides. Examples of polar polymers include, but are not necessarily limited to polyesters, polyamides, and mixtures thereof. The amount of such other materials present is in the range of from about 1% to about 99% by weight based on the total weight of the final blend or mixture.

The present invention is further illustrated by the examples below. These examples are not intended to limit the scope of the present invention which is defined by the claims and the specification.

COMPARATIVE EXAMPLE

Using a mono-disperse polystyrene-co-4-vinyl pyridine, P(ST-4-VP=85/15) latex, we have established that by pre-emulsification of each of the aromatic monomers with a mixture of an emulsifier and β-MCD, the monomer droplets are easily transported to the latex particles. Evidence of absorption of the monomer droplets by the latex particles was obtained by optical microscopy. We have found that the latex particles increase in size from an average of 80 nm to a maximum of 180 microns when brought into contact with the monodispersed emulsified monomer droplets. In the absence of β-MCD, a mixture of cyclic heteroatom containing polymerizable monomer and an emulsifier produces a precipitate.

The graft copolymerization of the aromatic monomers within the latex particles is efficiently initiated at room temperature and thereafter continued at 0° C. to yield a colloidal dispersion.

As discussed previously, the addition of methyl β-cyclodextrin (β-MCD) to the emulsified monomer mixture increases the compatibility of the aromatic monomers (aniline, pyrrole, furan and thiophene) in the aqueous phase by complexation. Because of the irregular size of the monomer droplets, the swelling of the latex particles in the absence of β-MCD is nonuniform and exceeded the predicted maximum particle size for a given ratio of monomer to latex particle concentration. In the absence of the latex, a typical mixture that composed of monomer, emulsifier, water and β-MCD, separates into distinct organic and aqueous phases upon standing undisturbed for a few minutes.

We have further discovered that the stability of the emulsified monomer mixture can be significantly improved by the addition of a minimum of 0.02 weight percent (based on the weight of aromatic monomer) of a poly(vinyl alcohol-co-vinyl acetate=88/12) (PVOH) copolymer. Optical microscopy of mixtures comprising of: surfactant, aniline, water, PVOH and an acrylic latex, reveals particles of uniform size comparable to the calculated average diameter for a monomer swollen latex particle of known average diameter.

We have also discovered that latices of 4-vinyl pyridine copolymers are stable in the presence of the required high concentration of the acidified redox pair, such as $FeCl_3$/$(NH_4)_2S_2O_8$, used in catalyzing the polymerization of the aromatic monomers.

Example of an Emulsion Polymerization Process for the Preparation of a Typical Acrylic Copolymer Latex The acrylic precursor latices were prepared by emulsion polymerization of commercially available: methyl methacrylate (MMA), poly(ethylene glycol (200/400) monomethacrylate, butyl acrylate (BA), ethyl acrylate (EA), methacrylate (MA), methacrylic acid (MAA), styrene, N-vinyl pyrrolidone (NVP) and 4-vinyl pyridine (4-VP) monomers. A typical acrylic copolymer comprising of 15 weight percent of 4 VP and the remainder MMA was prepared by an emulsion polymerization technique as follows: A monomer mixture was prepared, having methyl methacrylate: 4-vinyl pyridine ratio of 85:15. The mixture contained 53.0% of MMA, 9.3% of 4 VP, 0.19% of N-dodecyl mercaptan, 36.7% DI (de-ionized) water and 0.8% of a 10% aqueous sodium dioctyl sulfosuccinate (SOLUSOL-75) solution(all by weight). Each monomer mixture was polymerized according to the following procedure. To an appropriate glass vessel equipped with stirrer, heater, a reflux condenser, and nitrogen sparge tube, was added 95.9% of deionized water, and 0.03% of sodium carbonate. The mixture was sparged for one hour with nitrogen while heating to 70° C. The sparge rate was then changed to a sweep and 2.8% of a 10% aqueous solution of SOLUSOL-75 was added to the mixture. The temperature of the reaction vessel was then raised to 85° C. At this temperature 124.96 ml of the initiator mixture that consisted of 0.35% of sodium persulfate and 99.65% of deionized water was added to the reaction vessel. The monomer mixture was then fed into the reaction vessel at the rate of 51.84 ml/min. As the polymerization proceeded, the initiator mixture was added to the reaction vessel at the rate of 124.96 ml every 15 minutes. The accumulation of solids was measured every 60 minutes just before the addition of the initiator mixture. At the completion of the initiator and monomer addition the mixture was held at 85° C. for one hour.

COMPARATIVE EXAMPLES 1–3

In these examples, 10.0 grams of an acrylic copolymer, poly(ST-4VP=85/15) latex, (concentration=30 wt % solid content, average particle size=90nm) was combined with 3.5 grams of a 10 wt. % sodium dodecyl benzene sulfonate solution and 7.0 grams of each of the respective aromatic monomers: thiophene, pyrrole and furan. Each mixture was vigorously agitated for one hour at 50° C. It was observed that in each solution the cyclic aromatic monomers (furan, pyrrole and thiophene) remained as a separate phase, TABLE I.

EXAMPLES 4–6

In these examples, a total of 7 grams of a 50.8 weight percent of aqueous methyl β-cyclodextrin solution was added to each of the mixtures, as described in the comparative examples 1–3, TABLE I. In each case, it was observed that the emulsion particles present in the mixture at a concentration of 30% w/w appeared to become saturated with the 70% w/w of the respective monomer. The highly saturated emulsion particles appeared to coalesce into a single mass. Upon vigorous agitation, the mass disintegrated and dispersed into the aqueous phase. Optical microscopy of this inhomogeneous mixture revealed particles of a gradation of sizes that varied from a minimum of 0.7 to a maximum of 1.9 μm. This anomalous particle size distribution exceeded the calculated maximum particle size (0.107 μm) for uniform swelling of, 90 nm average, emulsion particles. When the emulsion of example-5, TABLE II, was replaced with distilled water, there was no optical evidence of the presence of microscopic particles. This observation suggests that the methyl β-cyclodextrin acted as a vehicle for the transportation of the sparingly soluble aromatic monomers through the aqueous medium to the surface of the emulsion particles.

EXAMPLE 7

To a mixture that was composed of 10 g of, P(ST-4VP=85/15), copolymer latex (30% solids content), 99.5 g of distilled water, 20.63 g of a 10% SOLUSOL-75 solution was added an emulsified monomer mixture. The monomer mixture was composed of: 100 g of pyrrole, 2.0 g of β-MCD, 61.1 g of distilled water, 6.9 g of a 10% SOLUSOL-75 solution. The emulsified monomer mixture and catalyst (1M $FeCl_3$ plus 1 M $(NH_4)_2S_2O_8$) were added to the latex dropwise. The polymerization is carried out at 50° C. over a total of 3 hours. At the end of the polymerization, it was observed that a significant amount of coagulum was formed.

The polymer was isolated by centrifugation and washing with acetone and acidified (pH=3) distilled water. FTIR spectra of the effluent from the acetone wash showed no evidence of the P(ST-4VP=85/15) copolymer which was soluble in acetone. The bands that occurred in the FTIR spectrum, at 1550 and 1197 wave numbers, were characteristic of pyrrole ring vibrations. A comparison of the FTIR spectrum with that published by Chao and March (Hand Book of Conducting Polymers) for $FeCl_3$ polymerized pyrrole revealed that our emulsion prepared polypyrrole possessed all of the spectral features present in the Chao et al spectrum.

Further evidence for the formation of conductive polypyrrole was obtained from qualitative evaluation of surface resistivity of a compression molded briquette. Because polypyrrole was infusible, a binder was used to produce plastic flow at the molding temperature. The resulting briquette was fragile and showed evidence of macroscopic fissures. As a result only certain regions of the briquette's surface showed evidence of measurable resistivity.

Measurements of the surface resistance, TABLE III, of briquettes derived from emulsion prepared two stage poly (styrene-co-4-vinyl pyridine)/poly(pyrrole) composite yielded a surface resistance value of 9M Ohms/sq.

EXAMPLE 8

The emulsion polymerization technique described above was used to prepare the acrylic copolymer latex, P(MMA-4VP=85/15). The latex was prepared in a 3 liter reactor using 0.5 weight percent of the emulsifier, NaDDBS. The polymerization conditions yielded a 29.70 wt. % solids latex of average particle size 89 nm. The aniline monomer swelling characteristics of this copolymer are listed in TABLE IV.

EXAMPLE 9

A mixture that was composed of 84.18 g of, P(MMA-4VP=85/15) EXAMPLE 8, copolymer latex (29.7% solids content) and 10.0 g of distilled water was placed in a 0.5 liter reaction flask. The polymerizable monomer mixture was composed of: 75 g of Aniline, 0.15 g of PVOH, 133.33 g of distilled water and 2.25 g of NaDDBS solution. The entire emulsified monomer mixture was added to the latex in the reactor flask dropwise. The contents in the reaction flask were held at 50° C. under a nitrogen blanket for one hour. At the end of the hold period, the temperature was reduced to 25° C. and the polymerization was carried out with the addition of catalyst (75 ml of 1.2M HCl plus 75 ml of 1.2 M $(NH_4)_2S_2O_8$ solutions) at 0.42 ml/minute at this temperature over a total of 3 hours. At the end of the polymerization, it was observed that a significant amount of coagulum, 31.0 g, was formed. The average size of the latex particles was 6685 nm.

TABLE I

Composition of Emulsified Aromatic Monomer Mixtures.

| EX: | P(ST-4VP = 85/15) 30% Solids (g) | NaDDBS 10% Soln. | Monomer 7.00 (g) |
|---|---|---|---|
| 1. | 10 | 3.5 | THIOPHENE |
| 2. | 10 | 3.5 | PYRROLE |
| 3. | 10 | 3.5 | FURAN |

TABLE II

Use of methyl β-Cyclodextrin as a Vehicle for Improving the Solubility of Sparingly Soluble Aromatic Monomers.

| EX: | P(ST-4VP = 85/15) 30% Solids (g) | NaDDBS 10% SOLN. | Monomer 7.00 (g) | β-Cyclo-dextrin (g) |
|---|---|---|---|---|
| 4. | 10 | 0.5 | THIOPHENE | 7.00 |
| 5. | 10 | 0.5 | PYRROLE | 7.00 |
| 6. | 10 | 0.5 | FURAN | 7.00 |

TABLE III

Surface Resistance of an Emulsion Prepared Sample of Poly(pyrrole)/Poly(ST-4-VP) Composite.

| EX: | Polymer | Resistance (M Ohm/sq.) |
|---|---|---|
| 7. | Poly(pyrrole)/Poly(ST-4VP = 85/15) = 97/03 | 9.0 |

In these examples the stable emulsified aniline monomer mixture is composed of the following ingredients: three weight percent of sodium dodecyl benzene sulphonate, 0.2 weight percent of PVOH and 62 weight percent of distilled water; all percentages were based on the weight of monomer.

We have determined, by both optical microscopy and particle size analysis techniques, that stable emulsions of uniform predictable particle size, TABLE IV, could be easily prepared from a 3:1 weight ratio mixture of aniline monomer to solid polymer particles respectively. From the data listed in TABLE IV, it can be discerned that the sorption capacity of the copolymer particles for aniline monomer droplets was a function of the comonomer content and physical nature of the comonomer functional group(s). Another interesting observation that can be made from the data of TABLE IV, is the reasonable agreement between estimated and experimentally determined swollen polymer particle diameters.

TABLE IV

Comparison of the size of single and two stage emulsion prepared polymer particles before and after absorption of aniline monomer.

| EX: | Emulsion Polymers | Particle Size (nm) | Estimated Size (nm) | Swollen Size (nm) |
|---|---|---|---|---|
| 9. | P(MMA-4VP = 85/15) | 89 | 141 | 102 |
| 10. | P(ST-4VP = 85/15) | 90 | 143 | 134 |
| 11. | P(MMA-EA-SSA = 50/45/05) | 685 | 1087 | 843 |
| 12. | P(MMA-EA-ALMA = 95.8/4.0/0.2)/P(BA-ST-ALMA = 80/18/02) (1:4) | 270 | 429 | 378 |
| 13. | P(BA-Butadiene = 60/40) | 259 | 411 | 338 |
| 14. | P(MMA-MAA = 80/20) | 107 | 170 | 112 |

EXAMPLE 15

A mixture composing of 269.38 g of the latex, described in EXAMPLE 8, 20.00 g of aniline, 35.55 g of distilled water, 2.5 ml of a 2.0 wt. % PVOH solution and 7.5 ml of a 10 wt. % NaDDBS solution was heated at 65° C. for one hour. The mixture was then cooled to room temperature (25° C.). After cooling 10 ml of the mixture was added to a glass reactor at 1.8 ml/min. The reactor was previously charged with: 25.0 g of a 1.2 M aqueous HCl solution, 25.0 g of a 1.2M aqueous $(NH_4)_2S_2O_8$ (APS) solution and 10.0 g of distilled water. The contents of the glass reactor were constantly sparged with dry nitrogen. After a few minutes the contents of the reactor took on a dark green appearance. After the dark green color had persisted for 10 minutes, the monomer mixture and catalyst (50.00 ml of 1.2 M APS solution plus 50.00 ml of 1.2 M HCl solution) were fed into the reactor at 1.6 ml/min. and 0.42 ml/min. respectively. The latex, derived from these condition, had an average particle size of 616 nm.

EXAMPLE 16

In this example 20 grams of an acrylic copolymer, P(MMA-4VP=85/15), latex that composed of 30 percent solid polymer particles was combined with an emulsified monomer mixture. The monomer mixture was composed of: 18 g of Aniline, 5.4 g of a 10% NaDDBS solution, 31.68 g of distilled water and 0.72 g of a 5% PVOH aqueous solution. The entire mixture was then heated in a constant temperature bath for 3 hours at 35° C. At the end of the thermal treatment, 10 g of the mixture is cooled to 2° C. and titrated simultaneously with 11.0 ml of a 0.02 M $(NH_4)_2S_2O_8$ solution and 11.0 ml of a 0.02 M HCl solution.

At the end of the polymerization a stable emulsion was obtained. The acrylic-aniline copolymer was found to be electronically conductive. Since polyaniline is intractable and insoluble in the conductive state, it is envisaged that this highly conductive two stage polymer should be processable by current thermoplastic processing techniques as extrusion, molding and thermoforming. The conductivity of this composite is recorded in TABLE V.

EXAMPLE 17

In this example 20 grams of an acrylic copolymer, P(ST-4VP=85/15), latex that composed of 30 percent solid polymer particles was combined with an emulsified monomer mixture. The monomer mixture was composed of: 18 g of aniline, 5.4 g of a 10% NaDDBS solution, 31.68 g of distilled water and 0.72 g of a 0.2% PVOH aqueous solution. The entire mixture was then heated in a constant temperature bath for 3 hours at 35° C. At the end of the thermal treatment, 10 g of the mixture was cooled to 2° C. and titrated simultaneously with 6.0 ml of a 0.1 M $(NH_4)_2S_2O_8$ solution and 6.0 ml of a 0.1 M HCl solution.

A stable emulsion was obtained at the end of the polymerization. The acrylic-aniline copolymer was found to be electronically conductive. Optical microscopy has revealed that the monodisperse polymer particles were of the order of 25 to 83 $\mu$m. Since polyaniline is intractable and insoluble in the conductive state, it is envisaged that this highly conductive two stage polymer should be processable by such current thermoplastic processing techniques as extrusion, molding and thermoforming. The conductivity of this composite is recorded in TABLE V.

TABLE V

Comparison of the surface resistance of two stage Aniline copolymers.

| EX: | POLYMER | THICKNESS $\mu$m | SURFACE RESISTANCE $\Omega$/sq. |
|---|---|---|---|
| 16. | Poly(aniline)/Poly(MMA-4VP = 85/15) = 3:1 | 60 | 18.7 k |
| 17. | Poly(aniline)/Poly(ST-4VP = 85/15) = 3:1 | 10 | 49.9 k |

EXAMPLE 18

The emulsion polymerization technique described above was used to prepare the acrylic copolymer latex, P(MMA-4VP=85/15). The latex was prepared in a 5 liter reactor using 0.5 weight percent of the emulsifier, NaDDBS. The polymerization conditions yielded a 30 wt. % solids latex of average particle size 203 nm. The glass transition temperature and the thermal stability of the isolated polymer particles were evaluated by DSC and TGA, TABLE VI, respectively.

EXAMPLE 19

A mixture composing of 252.54 g of the latex, described in EXAMPLE 18, 25.00 g of aniline, 44.44 g of distilled water, 2.5 ml of a 2.0 wt. % PVOH solution and 7.5 ml of a 10 wt. % NaDDBS solution was heated at 50° C. for one hour. The mixture was then cooled to room temperature (25° C.). After cooling 10 ml of the mixture was added to a glass reactor at 1.8 ml/min. The reactor was previously charged with: 10.0 g of a 1M aqueous HCl solution, 10.0 g of a 0.81M aqueous $(NH_4)_2S_2O_8$ (APS) solution and 40.0 g of distilled water. The contents of the glass reactor were constantly sparged with dry nitrogen. After a few minutes the contents of the reactor took on a dark green appearance. After the dark green color had persisted for 10 minutes, the temperature of the reactor was reduced to 0° C. and the monomer mixture and catalyst (141.00 ml of 0.8 M APS solution plus 141.00 ml of 1 M HCl solution) are fed into the reactor at 1.8 ml/min. and 0.8 ml/min. respectively. The thermal properties and electronic conductivity of this material are listed in TABLE VI.

EXAMPLE 20

The emulsion polymerization technique described above was used to prepare the acrylic copolymer latex, P(MMA-4VP=85/15). The latex was prepared in a 3 liter reactor using 2.75 weight percent of the emulsifier, SOLUSOL-75. These polymerization conditions yielded a 29 wt. % solids latex of average particle size 63 nm. The glass transition temperature and the thermal stability of the isolated polymer particles were evaluated by DSC and TGA, TABLE VI, respectively.

EXAMPLE 21

A mixture composing of 252.54 g of the latex, described in EXAMPLE 20, 25.00 g of aniline, 44.44 g of distilled water, 2.5 ml of a 2.0 wt. % PVOH solution and 7.5 ml of a 10 wt. % NaDDBS solution was heated at 50° C. for one hour. The mixture was then cooled to room temperature (25° C.). After cooling 10 ml of the mixture was added to a glass reactor at 1.8 ml/min. The reactor was previously charged with: 10.0 g of a 1 M aqueous HCl solution, 10.0 g of a 0.81M aqueous $(NH_4)_2S_2O_8$ (APS) solution and 40.0 g of distilled water. The contents of the glass reactor were constantly sparged with dry nitrogen. After a few minutes the contents of the reactor took on a dark green appearance. After the dark green color had persisted for 10 minutes, the temperature of the reactor was reduced to 0° C. and the monomer mixture and catalyst (141.00 ml of 0.8 M APS solution plus 141.00 ml of 1 M HCl solution) were fed into the reactor at 1.8 ml/min. and 0.8 ml/min. respectively. The thermal properties and electronic conductivity of this material are listed in TABLE VI.

EXAMPLE 22

The emulsion polymerization technique described earlier was used to prepare the acrylic copolymer latex, Poly(BA-MMA=85/15). The latex was prepared in a 5 liter reactor using 2.75 weight percent of the emulsifier, NaDDBS. These polymerization conditions yielded a latex of 30 wt. % solids content and average particle size of 80 nm. The glass transition temperature and the thermal stability of the isolated polymer particles were evaluated by DSC and TGA, TABLE VI, respectively.

EXAMPLE 23

A mixture composing of 252.54 g of the latex, described in EXAMPLE 22, 25.00 g of aniline, 44.44 g of distilled water, 2.5 ml of a 2.0 wt. % PVOH solution and 7.5 ml of a 10 wt. % NaDDBS solution was heated at 50° C. for one hour. The mixture was then cooled to room temperature (25° C.). After cooling 10 ml of the mixture was added to a glass reactor at 1.8 ml/min. The reactor was previously charged with: 10.0 g of a 1 M aqueous HCl solution, 10.0 g of a 0.81M aqueous $(NH_4)_2S_2O_8$ (APS) solution and 74.0 g of distilled water. The content of the glass reactor was constantly sparged with dry nitrogen. After a few minutes the contents of the reactor took on a dark green appearance. The temperature of the reactor was reduced to 0° C., after the dark green color has persisted for 10 minutes, and the monomer mixture and catalyst (141.00 ml of 0.8 M APS solution plus 141.00 ml of 1 M HCl solution) were fed into the reactor at 1.8 ml/min. and 0.8 ml/min. respectively. The emulsion obtained from these conditions was unstable relative to that of the initial latex described in example 20. The data is listed in TABLE VI.

EXAMPLE 24

The emulsion polymerization technique described earlier was used to prepare the acrylic terpolymer latex, P(MMA-BA-4VP=45/40/15). The latex was prepared in a 3 liter reactor using 2.75 weight percent of the emulsifier, NaDDBS. These polymerization conditions yielded a latex of 29.32 wt.% solids content and average particle size of 83 nm. The glass transition temperature and the thermal stability of the isolated polymer particles were evaluated by DSC and TGA, TABLE VI, respectively.

EXAMPLE 25

A mixture composing of 252.54 g of the latex, described in EXAMPLE 24, 25.00 g of aniline, 44.44 g of distilled water, 2.5 ml of a 2.0 wt. % PVOH solution and 7.5 ml of a 10 wt. % NaDDBS solution was heated at 50° C. for one hour. The mixture was then cooled to room temperature (25° C.). After cooling 10 ml of the mixture was added to a glass reactor at 1.8 ml/min. The reactor was previously charged with: 10.0 g of a 1 M aqueous HCl solution, 10.0 g of a 0.81M aqueous $(NH_4)_2S_2O_8$ (APS) solution and 74.0 g of distilled water. The contents of the glass reactor were constantly sparged with dry nitrogen. After a few minutes the contents of the reactor took on a dark green appearance. The temperature of the reactor was reduced to 0° C., after the dark green color has persisted for 10 minutes, and the monomer mixture and catalyst (141.00 ml of 0.8 M APS solution plus 141.00 ml of 1 M HCl solution) were fed into the reactor at 1.8 ml/min. and 0.8 ml/min. respectively. The emulsion obtained from these conditions was unstable relative to that of the initial latex described in example 22. The data is listed in TABLE VI.

EXAMPLE 26

The emulsion polymerization technique described earlier was used to prepare the acrylic terpolymer latex, P(MMA-EA-4VP=45/40/15). The latex was prepared in a 3 liter reactor using 2.75 weight percent of the emulsifier, NaDDBS. These polymerization conditions yielded a latex of 29.95 wt. % solids content and average particle size of 215 nm. The glass transition temperature and the thermal stability of the isolated polymer particles were evaluated by DSC and TGA, TABLE VI, respectively.

EXAMPLE 27

A mixture composing of 252.54 g of the latex, described in EXAMPLE 26, 25.00 g of aniline, 44.44 g of distilled water, 2.5 ml of a 2.0 wt. % PVOH solution and 7.5 ml of a 10 wt. % NaDDBS solution was heated at 50° C. for one hour. The mixture was then cooled to room temperature (25° C.). After cooling 10 ml of the mixture is added to a glass reactor at 1.8 ml/min. The reactor was previously charged with: 10.0 g of a 1 M aqueous HCl solution, 10.0 g of a 0.81M aqueous $(NH_4)_2S_2O_8$ (APS) solution and 74.0 g of distilled water. The contents of the glass reactor were constantly sparged with nitrogen. After a few minutes the contents of the reactor took on a dark green appearance. The temperature of the reactor was reduced to 0° C., after the dark green color has persisted for 10 minutes, and the monomer mixture and catalyst (141.00 ml of 0.8 M APS solution plus 141.00 ml of 1 M HCl solution) were fed into the reactor at 1.8 ml/min. and 0.8 ml/min. respectively. The emulsion obtained from these conditions was unstable relative to that of the initial latex described in example 24. The data is listed in TABLE VI.

EXAMPLE 28

The emulsion polymerization technique described earlier is used to prepare the acrylic terpolymer latex, P(MMA- EA-4VP=65/20/15). The latex was prepared in a 3 liter reactor using 2.75 weight percent of the emulsifier, NaDDBS. These polymerization conditions yielded a latex of 29.95 wt. % solids content and average particle size of 215 nm. The glass transition temperature and the thermal stability of the isolated polymer particles were evaluated by DSC and TGA, TABLE VI, respectively.

EXAMPLE 29

A mixture composing of 252.54 g of the latex, described in EXAMPLE 28, 25.00 g of aniline, 44.44 g of distilled water, 2.5 ml of a 2.0 wt. % PVOH solution and 7.5 ml of a 10 wt. % NaDDBS solution is heated at 50° C. for one hour. The mixture was then cooled to room temperature (25° C.). After cooling 10 ml of the mixture was added to a glass reactor at 1.8 ml/min. The reactor was previously charged with: 10.0 g of a 1 M aqueous HCl solution, 10.0 g of a 0.81M aqueous $(NH_4)_2S_2O_8$ (APS) solution and 74.0 g of distilled water. The contents of the glass reactor were constantly sparged with dry nitrogen. After a few minutes the contents of the reactor took on a dark green appearance. The temperature of the reactor was reduced to 0° C., after the dark green color had persisted for 10 minutes, and the monomer mixture and catalyst (141.00 ml of 0.8 M APS solution plus 141.00 ml of 1 M HCl solution) were fed into the reactor at 1.8 ml/min. and 0.8 ml/min. respectively. The emulsion obtained from these conditions was stable relative to that of the initial latex described in example 26. The data is listed in TABLE VI.

EXAMPLE 30

The emulsion polymerization technique described earlier was used to prepare the acrylic terpolymer latex, P(MMA-EA-4VP=70/15/15). The latex was prepared in a 3 liter reactor using 2.75 weight percent of the emulsifier, NaDDBS. These polymerization conditions yielded a latex of 29.74 wt. % solids content and average particle size of 126 nm. The glass transition temperature and the thermal stability of the isolated polymer particles were evaluated by DSC and TGA, TABLE VI, respectively.

EXAMPLE 31

A mixture composing of 252.54 g of the latex, described in EXAMPLE 30, 25.00 g of aniline, 44.44 g of distilled water, 2.5 ml of a 2.0 wt. % PVOH solution and 7.5 ml of a 10 wt. % NaDDBS solution was heated at 50° C. for one hour. The mixture was then cooled to room temperature (25° C.). After cooling 10 ml of the mixture was added to a glass reactor at 1.8 ml/min. The reactor was previously charged with: 10.0 g of a 1 M aqueous HCl solution, 10.0 g of a 0.81M aqueous $(NH_4)_2S_2O_8$ (APS) solution and 74.0 g of distilled water. The contents of the glass reactor were constantly sparged with dry nitrogen. After a few minutes the contents of the reactor took on a dark green appearance. The temperature of the reactor was reduced to 0°0 C., after the dark green color had persisted for 10 minutes, and the monomer mixture and catalyst (141.00 ml of 0.8 M APS solution plus 141.00 ml of 1 M HCl solution) were fed into the reactor at 1.8 ml/min. and 0.8 ml/min. respectively. The emulsion obtained from these conditions was stable relative to that of the initial latex described in example 28. The data is listed in TABLE VI.

EXAMPLE 32

A mixture composing of 252.54 g of the latex, described in EXAMPLE 18, 25.00 g of aniline, 10.44 g of distilled water, 2.5 ml of a 2.0 wt. % PVOH solution and 7.5 ml of a 10 wt. % NaDDBS solution is heated at 50° C. for one hour. The mixture was then cooled to room temperature (25° C.). A 1 liter glass reactor was charged with: 10.0 g of the latex prepared in example 17 and 74.0 g of distilled water. The contents of the glass reactor were constantly sparged with dry nitrogen. The temperature of the reactor was reduced to 0° C., and the monomer mixture and catalyst (141.0 ml of 0.8 M APS solution plus 141.00 ml of 1 M HCl solution) were fed into the reactor at 1.8 ml/min. and 0.8 ml/min. respectively. The emulsion obtained from these conditions was stable. The data is listed in TABLE VII.

This example elucidates the efficacy of preparing the poly(acrylic-aniline) copolymer by initiating the polymerization with the aid of previously prepared poly(acrylic-aniline) seed preform.

EXAMPLE 33

The emulsion polymerization technique described earlier was used to prepare the acrylic terpolymer latex, P(MMA-EA-4VP=75/10/15). The latex was prepared in a 3 liter reactor using 2.75 weight percent of the emulsifier, NaDDBS. These polymerization conditions yielded a latex of 29.99 wt. % solids content and average particle size of 89 nm. The glass transition temperature of the isolated polymer particles were evaluated by DSC. The data is recorded in TABLE VII.

EXAMPLE 34

A mixture composing of 252.54 g of the latex, described in EXAMPLE 33, 25.00 g of aniline, 44.44 g of distilled water, 2.5 ml of a 2.0 wt. % PVOH solution and 7.5 ml of a 10 wt. % NaDDBS solution was heated at 50° C. for one hour. The mixture was then cooled to room temperature (25° C.). After cooling 10 ml of the mixture was added to a glass reactor at 1.8 ml/min. The reactor was previously charged with: 10.0 g of a 1 M aqueous HCl solution, 10.0 g of a 0.81M aqueous $(NH_4)_2S_2O_8$ (APS) solution and 40.0 g of distilled water. The contents of the glass reactor were constantly sparged with nitrogen. After a few minutes the contents of the reactor took on a dark green appearance. The temperature of the reactor was reduced to 0° C., after the dark green color had persisted for 10 minutes, and the monomer mixture and catalyst (141.00 ml of 0.8 M APS solution plus 141.00 ml of 1 M HCl solution) were fed into the reactor at 1.8 ml/min. and 0.8 ml/min. respectively. The emulsion obtained from these conditions was stable relative to that of the initial latex described in example 31. The data is listed in TABLE VI.

EXAMPLE 35

A mixture composing of 252.54 g of the latex, described in EXAMPLE 30, 25.00 g of aniline, 10.44 g of distilled water, 2.5 ml of a 2.0 wt. % PVOH solution and 7.5 ml of a 10 wt. % NaDDBS solution is heated at 50° C. for one hour. The mixture was then cooled to room temperature (25° C.). A glass reactor was charged with: 10.0 g of a 1 M aqueous HCl solution, 10.0 g of a 0.81M aqueous $(NH_4)_2S_2O_8$ (APS) solution, 74.0 g of distilled water and g of the poly(acrylic-aniline) latex described in example 29. The contents of the glass reactor were constantly sparged with nitrogen. The temperature of the reactor was reduced to 0° C. and the monomer mixture and catalyst (141.00 ml of 0.8 M APS solution plus 141.00 ml of 1 M HCl solution) were fed into the reactor at 1.8 ml/min. and 0.8 ml/min. respectively. The emulsion obtained from these conditions was stable relative to that of the initial latex described in example 28. The data is listed in TABLE VII.

EXAMPLE 36

A mixture composing of 252.54 g of the latex, described in EXAMPLE 28, 25.00 g of aniline, 10.44 g of distilled water, 2.5 ml of a 2.0 wt. % PVOH solution and 7.5 ml of a 10 wt. % NaDDBS solution was heated at 50° C. for one hour. The mixture was then cooled to room temperature (25° C.). After cooling 10 ml of the mixture was added to a glass reactor at 1.8 ml/min. The reactor was previously charged with: 10.0 g of a 1 M aqueous HCl solution, 10.0 g of a 0.81M aqueous $(NH_4)_2S_2O_8$ (APS) solution and 74.0 g of distilled water. The contents of the glass reactor were constantly sparged with nitrogen. After a few minutes the contents of the reactor took on a dark green appearance. The temperature of the reactor was reduced to 0° C., after the dark green color has persisted for 10 minutes, and the monomer mixture and catalyst (141.00 ml of 0.8 M APS solution plus 141.00 ml of 1 M HCl solution) were fed into the reactor at 1.8 ml/min. and 0.8 ml/min. respectively. The emulsion obtained from these conditions was stable relative to that of the initial latex described in example 26. The data is listed in TABLE VII.

EXAMPLE 37

The emulsion polymerization technique described earlier was used to prepare the acrylic terpolymer latex, P(MMA-MA-4VP=75/10/15). The latex was prepared in a 3 liter reactor using 2.75 weight percent of the emulsifier, NaDDBS. These polymerization conditions yielded a latex of 29.81 wt. % solids content and average particle size of 123 nm. The glass transition temperatures of the isolated polymer particles were evaluated by DSC. The data is recorded in TABLE VII.

EXAMPLE 38

A mixture composing of 252.54 g of the latex, described in EXAMPLE 37, 25.00 g of aniline, 44.44 g of distilled water, 2.5 ml of a 2.0 wt. % PVOH solution and 7.5 ml of a 10 wt. % NaDDBS solution was heated at 50° C. for one hour. The mixture was then cooled to room temperature (25° C.). After cooling 10 ml of the mixture was added to a glass reactor at 1.8 ml/min. The reactor was previously charged with: 10.0 g of a 1 M aqueous HCl solution, 10.0 g of a 0.81M aqueous $(NH_4)_2S_2O_8$ (APS) solution and 40.0 g of distilled water. The contents of the glass reactor were constantly sparged with nitrogen. After a few minutes the contents of the reactor took on a dark green appearance. The temperature of the reactor was reduced to 0° C., after the dark green color had persisted for 10 minutes, and the monomer mixture and catalyst (141.00 ml of 0.8 M APS solution plus 141.00 ml of 1 M HCl solution) were fed into the reactor at 1.8 ml/min. and 0.8 ml/min. respectively. The emulsion obtained from these conditions was stable relative to that of the initial latex described in EXAMPLE 37. The data is listed in TABLE VII.

TABLE VI

Thermal and electrical properties of intrinsically conductive poly(acrylic-aniline) copolymer composites

| Examples | Particle Size (nm) | Tg (° C.) | Wt. Loss* % | Surface Res. (Ω/sq) | VOL. Cond. (S/cm) |
|---|---|---|---|---|---|
| 18. P(MMA-4VP = 85/15) | 203 | 122.2 | 0.86 | | |
| 19. EX. 18/aniline = 4:1 | 694 | 140.0 | 2.95 | 28M | |
| 20. P(MMA-4VP = 85/15) | 63 | 119.1 | 1.14 | | |
| 21. EX. 20/aniline = 4:1 | 753 | 133.4 | 3.32 | 9.4M | |
| 22. P(BA-MMA = 85/15) | 80 | −33.3 | | | |
| 23. EX. 22/aniline = 4:1 | | Unstable Emulsion | | | |
| 24. P(MMA-BA-4VP = 45/40/15) | 83 | 38.9 | | | |
| 25. EX. 24/aniline = 4:1 | | Unstable Emulsion | | | |
| 26. P(MMA-EA-4VP = 45/40/15) | 215 | 52.5 | | | |
| 27. EX. 26/aniline = 4:1 | | Unstable Emulsion | | | |
| 28. P(MMA-EA-4VP = 65/20/15) | 108 | 80.7 | | | |
| 29. EX. 28/aniline = 4:1 | 10,526 | 92.6 | 3.29 | 0.82M | |
| 30. P(MMA-EA-4VP = 70/15/15) | 126 | 93.8 | 1.11 | | |
| 31. EX. 30/aniline = 4:1 | 4,913 | 104.1 | 3.04 | 3.11M | $1.15 \times 10^{-4}$ |

*In air @ 200° C.

TABLE VII

Thermal properties of acrylic copolymers and poly(acrylic-aniline) composites

| EX: | POLYMER | EXPERIMENTALLY DETERMINED Tg (° C.) | PREDICTED Tg (° C.) | COND. $10^4$ S/cm |
|---|---|---|---|---|
| 18. | P(MMA-4VP = 85/15) | 122.2 | | |
| 32. | P(MMA-4VP-aniline = 68/12/20) | 137.5 | 138.5 | 0.5 |
| 33. | P(MMA-4VP-EA = 75/15/10) | 103.2 | | |
| 34. | P(MMA-4VP-EA-aniline = 60/12/8/20) | 117.5 | 121.9 | 0.7 |
| 30. | P(MMA-4VP-EA = 70/15/15) | 93.8 | | |
| 35. | P(MMA-4VP-EA-aniline = 56/12/12/20) | 107.0 | 113.6 | 2.0 |
| 28. | P(MMA-4VP-EA = 65/15/20) | 82.0 | | |

TABLE VII-continued

Thermal properties of acrylic copolymers and poly(acrylic-aniline) composites

| | | EXPERIMENTALLY | PREDICTED COND. | |
|---|---|---|---|---|
| EX: | POLYMER | DETERMINED Tg (° C.) | Tg (° C.) | $10^4$ S/cm |
| 36. | P(MMA-4VP-EA-aniline = 52/12/16/20) | 92.6 | 103.0 | 0.2 |
| 37. | P(MMA-4VP-MA = 75/15/10) | 109.7 | | |
| 38. | P(MMA-4VP-MA-aniline = 60/12/8/20) | 119.0 | 127.6 | 1.6 |

The foregoing examples are intended only for the purposes of illustrating the present invention. They should not be interpreted to limit the spirit and scope of the present invention which is solely defined by the following claims.

We claim:

1. A method for preparing an intrinsically conductive copolymer composition comprising:

preparing an emulsion latex in an aqueous medium;

forming a mixture which comprises at least one cyclic heteroatom-containing monomer, the emulsion latex in the aqueous medium and an additive under first condition effective to maintain the emulsion latex in a first stabilized emulsion state;

causing less than 10% by weight of the cyclic heteroatom-containing monomer based on total weight of the cyclic heteroatom containing monomer in the mixture to polymerize at a first reaction temperature and under second condition effective to produce a precursor to the intrinsically conductive copolymer in a second stabilized emulsion state; and converting the precursor and remainder of the cyclic heteroatom-containing monomer in the mixture at a second reaction temperature and under third condition effective to produce the conductive copolymer in a third stabilized emulsion state, wherein the second temperature is lower than the first temperature.

2. The method of claim 1, wherein the emulsion latex comprises a polymer prepared from at least one monomer selected from the group consisting of acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, poly(ethylene glycol[200/400]) monomethacrylate, ethylene glycol diacrylate, ethylene glycol dimethacrylate, ethylene, butadiene, isoprene, vinyl chloride, styrene sulfonic acid, allyl acrylate, allyl methacrylate, styrene, p-methylstyrene, 4-vinylpyridine, 2-vinylpyridine, N-vinylpyrrolidone, acrylamide, methacrylamide, N-methylolacrylamide, dimethylaminoethyl acrylate, and mixtures thereof.

3. The method of claim 1, wherein the cyclic heteroatom-containing monomer is selected from the group consisting of aniline, substituted anilines, thiophene, substituted thiophenes, furan, substituted furans, pyrrole, substituted pyrroles, and mixtures thereof; and the additive is selected from the group consisting of poly(vinyl alcohol), partially hydrolyzed poly(vinyl acetate), poly(vinyl acetate), cyclcodextrin, partially alkylated cyclodextrin and mixtures thereof.

4. The method of claim 1, wherein the additive is selected from the group consisting of poly(vinyl alcohol), partially hydrolyzed poly(vinyl acetate), poly(vinyl acetate), alpha-cyclodextrin, beta-cyclodextrin, gamma-cyclodextrin, beta-methyl-cyclodextrin, triacetyl beta-cyclodextrin, sulfated beta-cyclodextrin, hydroxyethyl alpha-cyclodextrin, hydroxyethyl beta-cyclodextrin, hydroxyethyl gamma-cyclodextrin, hydroxypropyl alpha-cyclodextrin, hydroxypropyl beta-cyclodextrin, hydroxypropyl gamma-cyclodextrin and mixtures thereof.

5. The method of claim 1, further comprising doping the conductive copolymer with a dopant, wherein the doping is carried out by contacting the conductive copolymer with the dopant in a solid, liquid, vapor or solution state.

6. The method of claim 5, wherein the dopant is selected from the group consisting of HCl, $BF_3$, $PCl_5$, $AlCl_3$, $SnCl_4$, $WCl_6$, $MoCl_5$, $Zn(NO_3)_2$, tetracyanoethylene, p-toluenesulfonic acid, trifluoromethyl sulfonic acid and mixtures thereof.

* * * * *

UNITED STATES PATENT AND TRADEMARK OFFICE
CERTIFICATE OF CORRECTION

PATENT NO. : 6,593,399 B1
DATED : July 15, 2003
INVENTOR(S) : Edward Ewart La Fleur and Jiun-Chen Wu It is certified that error appears in the above-identified patent and that said Letters Patent is hereby corrected as shown below:

<u>Title page,</u>
Item [75], Inventors, "Jiun-Chen Way" should be -- Jiun-Chen Wu --.

Signed and Sealed this

Eighteenth Day of November, 2003

JAMES E. ROGAN
*Director of the United States Patent and Trademark Office*